US012771749B2

(12) United States Patent
Shao et al.

(10) Patent No.: US 12,771,749 B2
(45) Date of Patent: Oct. 20, 2026

(54) INTERNET OF THINGS (IoT) SYSTEMS, METHODS, AND STORAGE MEDIA FOR ENERGY RECOVERY IN SMART GAS PIPELINE NETWORKS

(71) Applicant: CHENGDU QINCHUAN IOT TECHNOLOGY CO., LTD., Chengdu (CN)

(72) Inventors: Zehua Shao, Chengdu (CN); Yong Li, Chengdu (CN); Junyan Zhou, Chengdu (CN)

(73) Assignee: CHENGDU QINCHUAN IOT TECHNOLOGY CO., LTD., Chengdu (CN)

( * ) Notice: Subject to any disclaimer, the term of this patent is extended or adjusted under 35 U.S.C. 154(b) by 0 days.

(21) Appl. No.: 19/284,661

(22) Filed: Jul. 29, 2025

(65) Prior Publication Data

US 2025/0358334 A1 Nov. 20, 2025

(30) Foreign Application Priority Data

Jun. 30, 2025 (CN) ........................ 202510884012.3

(51) Int. Cl.
*H04L 67/12* (2022.01)
*G06Q 30/018* (2023.01)
*G06Q 50/06* (2024.01)

(52) U.S. Cl.
CPC ........... *H04L 67/12* (2013.01); *G06Q 30/018* (2013.01); *G06Q 50/06* (2013.01)

(58) Field of Classification Search
CPC ...... H04L 67/12; G06Q 30/018; G06Q 50/06; G06Q 10/04; G06Q 10/06315;
(Continued)

(56) References Cited

U.S. PATENT DOCUMENTS

2016/0356125 A1 12/2016 Bello et al.
2020/0027096 A1* 1/2020 Cooner ................. G06Q 40/04
(Continued)

FOREIGN PATENT DOCUMENTS

CN 116642132 A 8/2023
CN 119713138 A 3/2025

OTHER PUBLICATIONS

Yi, Yongqiang, Analysis on the key points of gas safety management supported by Internet of Things technology, Architectural knowledge, 2017, 3 pages.

*Primary Examiner* — Schquita D Goodwin
*Assistant Examiner* — Mehulkumar J Shah
(74) *Attorney, Agent, or Firm* — METIS IP LLC

(57) ABSTRACT

Provided are a method, a system, and a storage medium for energy recovery in a smart gas pipeline network. The method comprises: determining a future pressure regulation parameter and a future output pressure energy based on a future external information sequence, a current pressure regulation parameter of a target pressure regulating station, and sensor data information of the target pressure regulating station; determining a recovery parameter of a target pigging station corresponding to the target pressure regulating station based on the future output pressure energy; generating a recovery instruction based on the recovery parameter; and sending the recovery instruction to the target pigging station and controlling an operation of at least one of a pigging device and an energy storage device at the target pigging station.

19 Claims, 5 Drawing Sheets

(58) Field of Classification Search
CPC .... G06Q 10/30; G06Q 10/0631; F17D 5/005; F17D 5/00; G16Y 10/35; G16Y 20/10; G16Y 20/30; G16Y 40/10; G16Y 40/35
See application file for complete search history.

(56) References Cited

U.S. PATENT DOCUMENTS

| | | | | |
|---|---|---|---|---|
| 2023/0421638 | A1 | 12/2023 | Shao et al. | |
| 2024/0019086 | A1* | 1/2024 | Pirsiavash | F17D 5/00 |
| 2024/0201641 | A1* | 6/2024 | Shao | G05B 13/048 |
| 2024/0428206 | A1 | 12/2024 | Shao et al. | |
| 2025/0148430 | A1 | 5/2025 | Shao et al. | |

* cited by examiner

INTERNET OF THINGS (IoT) SYSTEMS, METHODS, AND STORAGE MEDIA FOR ENERGY RECOVERY IN SMART GAS PIPELINE NETWORKS

CROSS-REFERENCE TO RELATED APPLICATIONS

This application claims priority to Chinese Patent Application No. 202510884012.3, filed on Jun. 30, 2025, the entire contents of which are hereby incorporated by reference.

TECHNICAL FIELD

The present disclosure relates to the field of smart gas, and in particular, to an Internet of Things (IoT) system, a method, and a storage medium for energy recovery in a smart gas pipeline network.

BACKGROUND

Natural gas is an essential energy source in daily life. Its delivery requires a pressure adjustment process (e.g., boosting or reducing pressure) at a pressure regulating station before reaching an end-user. For example, during long-distance transmission, natural gas typically consumes power to driven a pressure boosting device at the pressure regulating station to increase a pipeline pressure for improved transmission efficiency. At a user-end, natural gas with a lower output pressure is usually needed, necessitating pressure reduction through a pressure reducing device at the pressure regulating station to meet low-pressure demand at the user-end.

In long-distance transmission of natural gas, the conversion from high-pressure natural gas in a pipeline to low-pressure gas output to the user-end releases substantial pressure energy. At present, in a process of recovering the pressure energy, it is not possible to accurately estimate the amount of pressure energy that will be generated in a future period. As a result, a recovery parameter of equipment (e.g., a device in a pigging station) that utilizes the output pressure energy may not be configured based on accurate estimations, leading to low energy recovery efficiency.

Therefore, it is desirable to provide an IoT system, a method, and a storage medium for energy recovery in a smart gas pipeline network, which are capable of accurately predicting the output pressure energy of a pressure regulating station during future periods, and, based on the predicted output pressure energy, determining in advance the recovery parameter of a target pigging station located downstream of the pressure regulating station. At least one of a pigging device and an energy storage device of the downstream target pigging station can then be controlled accordingly to improve energy utilization efficiency and the economic performance of gas pipeline network operations, thereby avoiding energy waste.

SUMMARY

One or more embodiments of the present disclosure provide an Internet of Things (IoT) system for energy recovery in a smart gas pipeline network, comprising: a government regulatory management platform, a government regulatory sensor network platform, a government regulatory object platform, a gas company sensor network platform, and a gas equipment object platform. The government regulatory object platform includes a gas company management platform. The gas company management platform and the government regulatory management platform are respectively deployed on different servers. The gas company management platform and the government regulatory management platform exchange data via the government regulatory sensor network platform. The gas company management platform exchanges data with the gas equipment object platform via the gas company sensor network platform. The government regulatory sensor network platform and the gas company sensor network platform operate based on a data communication device. The gas equipment object platform includes a pressure regulating station and a pigging station, wherein the pressure regulating station includes a pressure regulating device, and the pigging station includes a pigging device and an energy storage device. The gas company management platform is configured to implement a method for energy recovery in a smart gas pipeline network.

One or more embodiments of the present disclosure provide a method for energy recovery in a smart gas pipeline network. The method comprises: determining a future pressure regulation parameter and a future output pressure energy based on a future external information sequence, a current pressure regulation parameter of a target pressure regulating station, and sensor data information of the target pressure regulating station, wherein the future pressure regulation parameter includes a pressure regulation parameter corresponding to each of at least one unit time interval within a future preset period, and a length of the at least one unit time interval is determined based on a target pipeline characteristic of a connecting pipeline between the target pressure regulating station and a target pigging station; determining a recovery parameter of the target pigging station corresponding to the target pressure regulating station based on the future output pressure energy, wherein the recovery parameter includes at least one of a pigging parameter and an energy storage device parameter; generating a recovery instruction based on the recovery parameter; and sending the recovery instruction to the target pigging station and controlling an operation of at least one of the pigging device and the energy storage device at the target pigging station.

One or more embodiments of the present disclosure provide a non-transitory computer-readable storage medium storing computer instructions. When reading the computer instructions in the storage medium, a computer implements the method for energy recovery in a smart gas pipeline network described in one or more embodiments of the present disclosure.

BRIEF DESCRIPTION OF THE DRAWINGS

The present disclosure will be further illustrated by way of exemplary embodiments, which will be described in detail by means of the accompanying drawings. These embodiments are not limiting, and in these embodiments, the same numbering denotes the same structure, wherein.

DETAILED DESCRIPTION

Figure 1:
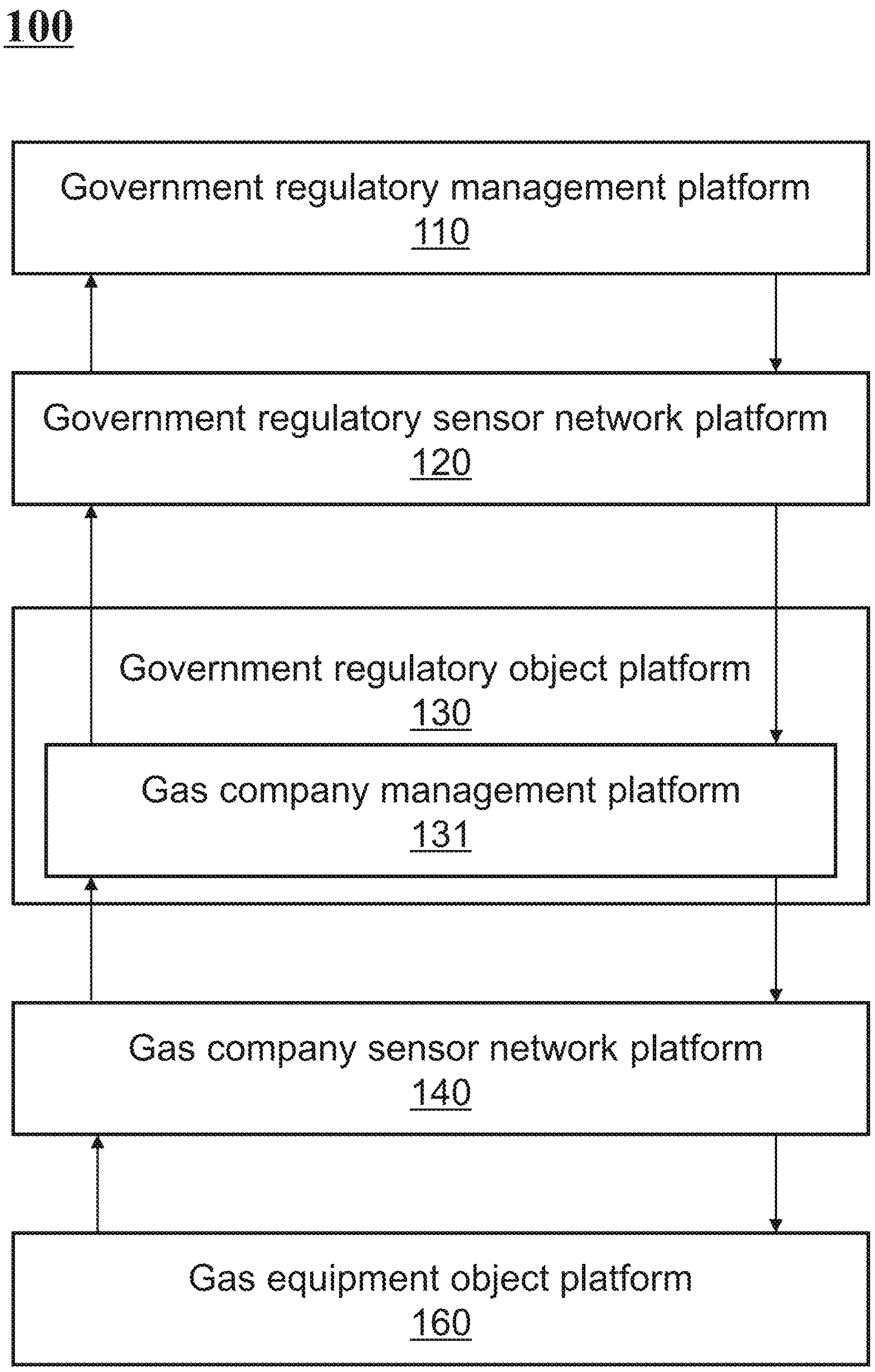
FIG. 1 is a block diagram illustrating exemplary platforms of an IoT system for energy recovery in a smart gas pipeline network according to some embodiments of the present disclosure.

To more clearly illustrate the technical solutions of the embodiments of the present disclosure, the accompanying drawings to be used in the description of the embodiments will be briefly described below. Obviously, the accompanying drawings in the following description are only some examples or embodiments of the present disclosure, and that the present disclosure may be applied to other similar scenarios in accordance with these drawings without creative labor for those of ordinary skill in the art. Unless obviously acquired from the context or the context illustrates otherwise, the same numeral in the drawings refers to the same structure or operation.

It should be understood that terms such as "system," "device," "equipment," "unit," and "module" as used herein is a way to distinguish between different components, elements, parts, sections, or assemblies at different levels. However, these words may be replaced by other expressions if they accomplish the same purpose.

As indicated in the present disclosure and in the claims, the singular forms "a," "an," and "the" may be intended to include the plural forms as well, unless the context clearly indicates otherwise. In general, the terms "comprise," "comprises," and/or "comprising," "include," "includes," and/or "including," when used in this disclosure, specify the presence of stated features, integers, steps, operations, elements, and/or components, but do not preclude the presence or addition of one or more other features, integers, steps, operations, elements, components, and/or groups thereof.

Flowcharts are used in the present disclosure to illustrate the operations performed by the system according to some embodiments of the present disclosure. It should be understood that the operations described herein are not necessarily executed in a specific order. Instead, they may be executed in reverse order or simultaneously. Additionally, one or more other operations may be added to these processes, or one or more operations may be removed.

FIG. 1 is a block diagram illustrating exemplary platforms of an IoT system for energy recovery in a smart gas pipeline network according to some embodiments of the present disclosure.

As shown in FIG. 1, an IoT system 100 for energy recovery in a smart gas pipeline network may include: a government regulatory management platform 110, a government regulatory sensor network platform 120, a government regulatory object platform 130, a gas company sensor network platform 140, and a gas equipment object platform 160.

The government regulatory management platform 110 refers to a platform for government supervision and management.

In some embodiments, the government regulatory management platform 110 is configured as a first server and a first database.

In some embodiments, the government regulatory management platform 110 may determine a backup recovery strategy based on recoverable pressure energy data.

The government regulatory sensor network platform 120 refers to an interface platform enabling data exchange between the government regulatory management platform 110 and the government regulatory object platform 130.

In some embodiments, the government regulatory sensor network platform 120 operates based on a data communication device and is configured with a gateway and a data interface.

In some embodiments, the government regulatory sensor network platform 120 may be configured to acquire the recoverable pressure energy data generated by a gas company management platform 131 and transmit the recoverable pressure energy data to the government regulatory management platform 110.

In some embodiments, the government regulatory sensor network platform 120 may also obtain the backup recovery strategy generated by the government regulatory management platform 110 and transmit the backup recovery strategy to the gas company management platform 131. More descriptions may be found in FIG. 5 and related descriptions thereof.

The government regulatory object platform 130 refers to a functional platform for generating sensing information and executing control instructions.

In some embodiments, the government regulatory object platform 130 may exchange information with the government regulatory sensor network platform 120 and the gas company sensor network platform 140.

In some embodiments, the government regulatory object platform 130 may include the gas company management platform 131.

The gas company management platform 131 refers to a platform for generating sensing information and executing control instructions.

In some embodiments, the gas company management platform 131 is configured as a second server and a second database.

In some embodiments, the gas company management platform 131 is configured to execute steps 210-250 in a method for energy recovery in a smart gas pipeline network. More descriptions may be found in FIG. 2 and related descriptions thereof.

In some embodiments, the gas company management platform 131 and the government regulatory management platform 110 are deployed on separate servers. That is to say, the first server and the second server may be distinct physical servers, each equipped with a processor.

The gas company sensor network platform 140 refers to an interface platform enabling data exchange between the government regulatory object platform 130 and the gas equipment object platform 160. The gas company sensor network platform 140 operates based on a data communication device.

In some embodiments, the gas company sensor network platform 140 may acquire a recovery instruction generated by the gas company management platform 131 and transmit the recovery instruction to a target pigging station.

The gas equipment object platform 160 refers to a functional platform for generating sensing information and executing control instructions.

In some embodiments, the gas equipment object platform 160 may include pressure regulating stations and pigging stations, interconnected via gas pipelines.

A pressure regulating station refers to a facility for adjusting natural gas pressure during gas transportation. The pressure regulating station may perform pressure boosting or reduction on the natural gas, and is typically installed in the gas pipeline network to facilitate pressure adjustment and gas transportation. In some embodiments, the pressure regulating station includes a pressure regulating device.

The pressure regulating device refers to devices for increasing or decreasing gas pressure.

In some embodiments, the pressure regulating device includes a pressure boosting device and a pressure reducing device. For example, the pressure boosting device includes least one of a screw compressor, a centrifugal compressors, a booster unit, or the like. The pressure reducing device includes a pressure regulating valve, or the like.

A pigging station refers to a facility for pipeline cleaning and maintenance. The pigging station may be installed on the gas pipeline network, and configured to enable gas transportation while performing pipeline cleaning and maintenance. In some embodiments, the pigging station includes a pigging device and an energy storage device.

The pigging device refers to a device for cleaning gas pipelines, such as a pipeline pig, or the like. The pipeline pig may include a pigging ball, or the like.

The energy storage device refers to a device for energy storage, such as a generator set, a battery, or the like.

During the transportation of high-pressure natural gas from a wellhead to an end-user through gas pipelines, at least one pressure regulating station and at least one pigging station may be installed on the gas pipeline network. The at least one pressure regulating station and the at least one pigging station are arranged alternately with each pigging station corresponding to one pressure regulating station.

Different outlet pressures result in varying amounts of output pressure energy. The higher the outlet pressure at the pressure regulating station is, the greater a pressure drop is, and consequently, the more output pressure energy is released. The output pressure energy may be captured by a downstream pigging station for pipeline cleaning, maintenance, electrical energy storage, or the like, thereby eliminating the need for external energy input and preventing energy waste.

For example, when pipeline cleaning and maintenance is required, the pigging device (e.g., a pigging ball) from the downstream pigging station may be deployed into a gas pipeline between the pressure regulating station and the corresponding pigging station. The pigging device may flow from one end of the gas pipeline to the other end under an action of kinetic energy converted from the output pressure energy released by the natural gas, and then be retrieved by a pigging recovery device arranged at the other end of the gas pipeline. In this way, the pigging station can clean the gas pipeline without requiring additional external energy input.

If the output pressure energy released by the natural gas from the pressure regulating station is relatively large, the excess output pressure energy may also be converted into electrical energy and stored by the energy storage device within the pigging station as the gas flows to the downstream pigging station. The stored energy may be used subsequently by the pigging ball in the pigging station.

More descriptions regarding the platforms in the IoT system 100 may be found in FIGS. 2-5 and related descriptions thereof.

Figure 2:
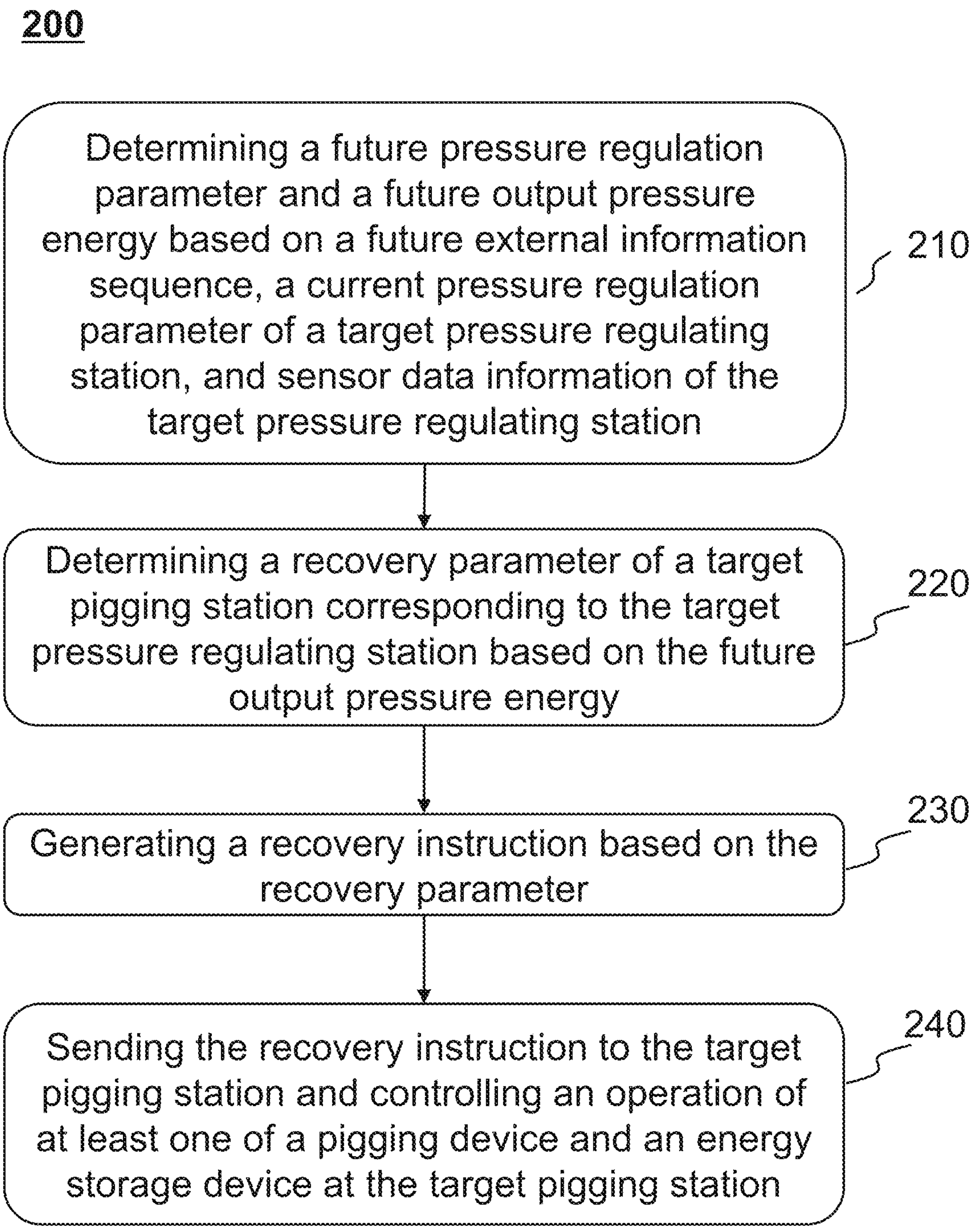
FIG. 2 is a flowchart of an exemplary process of a method for energy recovery in a smart gas pipeline network according to some embodiments of the present disclosure.

FIG. 2 is a flowchart of an exemplary process of a method for energy recovery in a smart gas pipeline network according to some embodiments of the present disclosure. In some embodiments, process 200 may be executed by the gas company management platform 131 in the IoT system 100. As shown in FIG. 2, process 200 comprises steps 210-240.

Step 210: Determining a future pressure regulation parameter and a future output pressure energy based on a future external information sequence, a current pressure regulation parameter of a target pressure regulating station, and sensor data information of the target pressure regulating station.

The pressure regulation parameter refers to a configuration parameter of a pressure regulating device. The pressure regulating parameter may include at least one of a set output pressure, a set output temperature, a compression ratio, and an operating power. The set output pressure and the set temperature refer to a pressure and a temperature predetermined in advance at which the pressure regulating device outputs natural gas.

The future output pressure energy refers to an output pressure energy. The output pressure energy refers to energy released from a pressure loss when high-pressure natural gas flows from a high-pressure region at the wellhead to a low-pressure region at the user end of natural gas. The longer a transmission distance of the output pressure energy and the larger a diameter of the pipeline transmitting the gas are, the greater a probability of energy loss is. Therefore, timely predicting the future output pressure energy and prompt supply the future output pressure energy to a target pigging station can prevent waste of the future output pressure energy.

The future preset period refers to a period from a current time point to a preset future time point. The future preset period may be determined empirically by a person of ordinary skill in the art.

The future external information sequence refers to a sequence composed of a plurality of types of external information during the future preset period. In some embodiments, the external information during the future predetermined period may include future weather information, future environmental information, etc. of an environment in which the target pressure regulating station is located.

The future weather information may include forecasted atmospheric pressure, air temperature, or the like for the future preset period.

In some embodiments, the gas company management platform 131 may obtain the future weather information from a third-party source (e.g., a meteorological bureau).

The future environmental information refers to information including a pipeline type of the pipeline connecting the target pressure regulating station and the target pigging station downstream the target pressure regulating station, an environmental temperature during the future preset period, an environmental pressure during the future preset period, etc. The environmental temperature and the environmental pressure during the future preset period may differ from corresponding data in the future weather information.

The pipeline type may include one of an exposed pipeline, a buried pipeline, a subsea pipeline, etc. The pipeline type is predetermined by a person of ordinary skill in the art based on an actual installed pipeline configuration.

In some embodiments, the gas company management platform employs the following first algorithm to determine the environmental temperature, denoted as T, during the future preset period:

$$T=T1\times a+T2\times b,$$

wherein T1 represents a currently measured environmental temperature. T2 denotes a forecasted weather temperature for the future preset period, a and b are coefficients greater than 0 and less than 1, predetermined by a person of ordinary skill in the art based on experience In some embodiments, the gas company management platform may obtain the currently measured environmental temperature through a temperature sensor installed externally on the pipeline.

In some embodiments, the coefficient a is positively correlated with a burial depth of the gas pipeline, and the coefficient b is negatively correlated with the burial depth of the gas pipeline. The burial depth refers to a vertical distance from the underground gas pipeline to a ground surface.

For example, for the exposed pipeline, since the weight of the future environmental information is low, the gas company management platform may directly designate the future weather information as the future external information sequence.

As another example, for the buried pipeline less not easily affected by the future weather information, and the weight of the future weather information is low, the gas company management platform may directly designate the future environmental information as the future external information sequence.

The environmental pressure during the future preset period may be determined in a manner similar to the manner for determining the environmental temperature.

The pressure regulating station and the pigging station may be arranged alternately. More descriptions regarding the pressure regulating station and the pigging station may be may be found in FIG. 1 and the related descriptions thereof.

The target pressure regulating station refers to the station connected to and upstream of the target pigging station.

The target pigging station refers to a pigging station requiring determination of an operational parameter for at least one of a pigging device and an energy storage device at the pigging station at the current time point. More descriptions regarding the pigging device and the energy storage device may be found in FIG. 1 and related descriptions thereof. In some embodiments, the operational parameter of the pigging device may include a pigging parameter.

The pigging parameter may include a launch velocity of a pigging ball, a discharge volume of an air compressor, or the like. The operational parameter of the energy storage device may include an energy storage device parameter.

The energy storage device parameter refers to a parameter of the energy storage device at the target pigging station. The energy storage device parameter may include a generator set parameter, a charge/discharge cycle count, or the like.

The current pressure regulation parameter refers to the operational parameter of the pressure regulating device at the target station in a current state.

In some embodiments, the current pressure regulation parameter of the pressure regulating device at the target station is retrieved by the gas company management platform from a known database.

In some embodiments, the sensor data information includes at least one of a gas temperature and a gas pressure collected at an inlet or an outlet of the target pressure regulating station during a current period. The current period refers to a time period preceding the current time point (e.g., the day preceding the current time point). The current period may be preset by a person skilled in the art based on experience.

In some embodiments, the gas company management platform obtains the sensor data information via a sensor (e.g., a temperature sensor, a pressure sensor, etc.) installed at the inlet or the outlet of the target pressure regulating station. The future pressure regulation parameter refers to a pressure regulation parameters involved in a pressure boosting operation of high-pressure natural gas during long-distance transmission over the future preset period. In some embodiments, the future pressure regulation parameter includes a pressure regulation parameter corresponding to each of at least one unit time interval within the future preset period. The pressure regulation parameter includes output information and a compression parameter of the target pressure regulating station.

The output information includes at least one of a set output pressure and a set output temperature of the natural gas output from the target pressure regulating station. The set output pressure and the set output temperature of the natural gas output from the target pressure regulating station are hereinafter referred to as the set output pressure and set output temperature, respectively, for brevity. The compression parameter includes at least one of a compression ratio and an operating power of the natural gas output from the target pressure regulating station.

The compression ratio refers to a ratio between a natural gas pressure at the outlet of the pressure regulating station after compression and a natural gas pressure at the inlet of the pressure regulating station. The operating power refers to a power required for the operation of the pressure regulating device. The operating power is positively correlated with the compression ratio.

A unit time interval refers to a period of time. In some embodiments, the set output pressure and the set output temperature may vary across different unit time intervals. For example, a unit time interval corresponding to an evening period may have a higher set output pressure compared to other unit time intervals due to increased gas demand during the evening period.

In some embodiments, the gas company management platform may divide the future preset period into a preset count of unit time intervals. The preset count may be predetermined by a person skilled in the art based on experience.

In some embodiments, the gas company management platform determines a length of the at least one unit time interval based on a target pipeline characteristic.

The target pipeline characteristic refers to a feature of a connecting pipeline between the target pressure regulating station and the target pigging station. For example, the target pipeline characteristic includes at least one of a pipeline length, a material, a diameter, and a burial depth of the connecting pipeline between the target pressure regulating station and the target pigging station.

In some embodiments, the length of the at least one unit time interval is positively correlated with the pipeline length and the pipeline diameter. For example, the longer the pipeline length and the larger the pipeline diameter are, the longer the length of each unit time interval set by the gas company management platform. It is understood that the longer the pipeline length and the larger the pipeline diameter are, the longer it takes for the output pressure energy released by the output natural gas to be transmitted to the target pigging station, and the higher the probability of energy loss. In this case, if the unit time interval is set too short, the output pressure energy released by the natural gas output from the target pressure regulating station during the future preset period may not have reached the target pigging station. Therefore, setting a relatively long unit time interval can help avoid invalid calculations.

In some embodiments, the length of the at least one unit time interval is also related to a first pigging probability of the target pigging station. For example, the higher the first pigging probability of the target pigging station is, the shorter the length of the unit time interval is.

The first pigging probability refers to a probability that the target pigging station is performing a pigging operation.

In some embodiments, the gas company management platform obtains a fluctuation count of first upstream sensor data, and determines the first pigging probability of the target pigging station based on the fluctuation count.

The first upstream sensor data refers to data such as a gas temperature and a gas pressure collected by a sensor at a preset location during the current period. The preset location may be an intermediate location of a pipeline connecting a first upstream pigging station and the target pressure regulating station. The first upstream pigging station refers to a pigging station located upstream of and directly connected to the target pressure regulating station.

In some embodiments, the fluctuation count may be represented as a sum of a count of times a gas flow rate in the sensor data information of the target pressure regulating station exceeds a flow threshold, a count of times the gas pressure exceeds a pressure threshold, and a count of times the gas temperature exceeds a temperature threshold during the current period. The flow threshold, the pressure threshold, and the temperature threshold may be preset by those skilled in the art based on experience.

In some embodiments, the gas company management platform designates a ratio of the fluctuation count to a total data volume as the first pigging probability of the target pigging station.

The total data volume refers to a sum of a count of gas flow rate measurements, a count of gas pressure measurements, and a count of gas temperature measurements during the current period.

In some embodiments, the length of the at least one unit time interval is negatively correlated with the first pigging probability of the target pigging station. The higher the first pigging probability is, the shorter the length of the unit time interval may be set, so that the future pressure regulation parameter can be divided into pressure regulation parameters of more unit time intervals. This ensures that the future output pressure released by the target pressure regulating station when supplying natural gas can meet the demand of the target pigging station in each unit time interval.

In some embodiments, the he gas company management platform determines an adjustment amount based on the future external information sequence and the sensor data of the target pressure regulating station by referring to a first preset lookup table, and then takes a sum of the adjustment amount and the current pressure regulation parameter as the future pressure regulation parameter. The first preset lookup table contains a correspondence between reference external information sequences, reference sensor data of the target pressure regulating station, and reference adjustment amounts. The first preset lookup table may be constructed based on prior knowledge or historical data. By configuring the first preset lookup table, the future pressure regulation parameter is adjusted according to the future external information sequence. This ensures that when the target pressure regulating station operates under the future pressure regulation parameter, the future output pressure energy released by the supplied natural gas can meet the energy demand of the target pigging station.

In some embodiments, the gas company management platform determines the future output pressure energy based on the future pressure regulation parameter through a second preset lookup table. The future output pressure energy may include future output pressure energies for a plurality of unit time intervals.

The second preset lookup table contains a correspondence relationship between reference future pressure regulation parameters and reference output pressure energy. The second preset lookup table may be constructed based on prior knowledge or historical data.

In some embodiments, the gas company management platform determines a future gas variation characteristic of the target pressure regulating station based on the future external information sequence, the current pressure regulation parameter of the target pressure regulating station, and the sensor data information of the target pressure regulating station; and determines the future pressure regulation parameter and the future output pressure energy based on the gas variation characteristic and a preset pressure regulation plan. More descriptions may be found in FIG. 3 and the related descriptions thereof.

Step 220: Determining a recovery parameter of the target pigging station corresponding to the target pressure regulating station based on the future output pressure energy.

In some embodiments, the recovery parameter includes at least one of a pigging parameter and an energy storage device parameter.

More descriptions of the pigging parameter and the energy storage device parameter may be found in Step 210 of FIG. 2 and related descriptions thereof.

In some embodiments, the gas company management platform determines the recovery parameter through a third preset lookup table based on the future output pressure energy. The third preset lookup table contains a correspondence relationship between reference output pressure energy and reference recovery parameters. The third preset lookup table may be constructed based on prior knowledge or historical data.

In some embodiments, the gas company management platform determines recoverable pressure energy data based on the future output pressure energy, and determines the recovery parameter of the target pigging station corresponding to the target pressure regulating station based on the recoverable pressure energy data.

The recoverable pressure energy data refers to a future output pressure energy that may be recovered and utilized by the target pigging station. The recoverable pressure energy data may be used to drive the pigging device, assist in gas compression, power the energy storage devices, etc.

In some embodiments, the gas company management platform calculates the recoverable pressure energy data as a product of the future output pressure energy and a coefficient c. The coefficient c is any number between 0 and 1. The coefficient c may be preset by a person of ordinary skill in the art based on experience. The value of the coefficient c is negatively correlated with the pipeline length of the connecting pipeline between the target pressure regulating station and the target pigging station.

In some embodiments, the gas company management platform determines a transmission loss coefficient based on the target pipeline characteristic and environmental information of the connecting pipeline between the target pressure regulating station and the target pigging station; determines the recoverable pressure energy data based on the future output pressure energy and the transmission loss coefficient; sends the recoverable pressure energy data to a government regulatory management platform (e.g., the government regulatory management platform 110) and obtains a backup recovery strategy issued by the government regulatory management platform; and determines the recovery parameter of the target pigging station corresponding to the target pressure regulating station based on the backup recovery strategy. More descriptions may be found in FIG. 5 and the related descriptions thereof.

Step 230: Generating a recovery instruction based on the recovery parameter.

The recovery instruction refers to an instruction including the pigging parameter and the energy storage device parameter.

In some embodiments, the gas company management platform generates the recovery instruction containing the recovery parameter based on the recovery parameter.

Step 240: Sending the recovery instruction to the target pigging station and control an operation of at least one of the pigging device and the energy storage device at the target pigging station.

In some embodiments, the gas company management platform sends the recovery instruction to the target pigging station and controls the pigging device at the target pigging station to operate according to the pigging parameter, and/or controls the energy storage device to operate according to the energy storage device parameter.

In some embodiments of the present disclosure, by estimating in advance the future pressure regulation parameter and the future output pressure energy of the target pressure regulating station, the recovery parameter of the target pigging station corresponding to the target pressure regulating station is determined based on the future output pressure energy, and at least one the pigging device and the energy storage device at the target pigging station is controlled to operate. This achieves the utilization of the future output pressure energy for the operation of devices at the target pigging station, improves the energy utilization rate of the target pressure regulating station and the economic operation of the gas pipeline network, and avoids energy waste.

Figure 3:
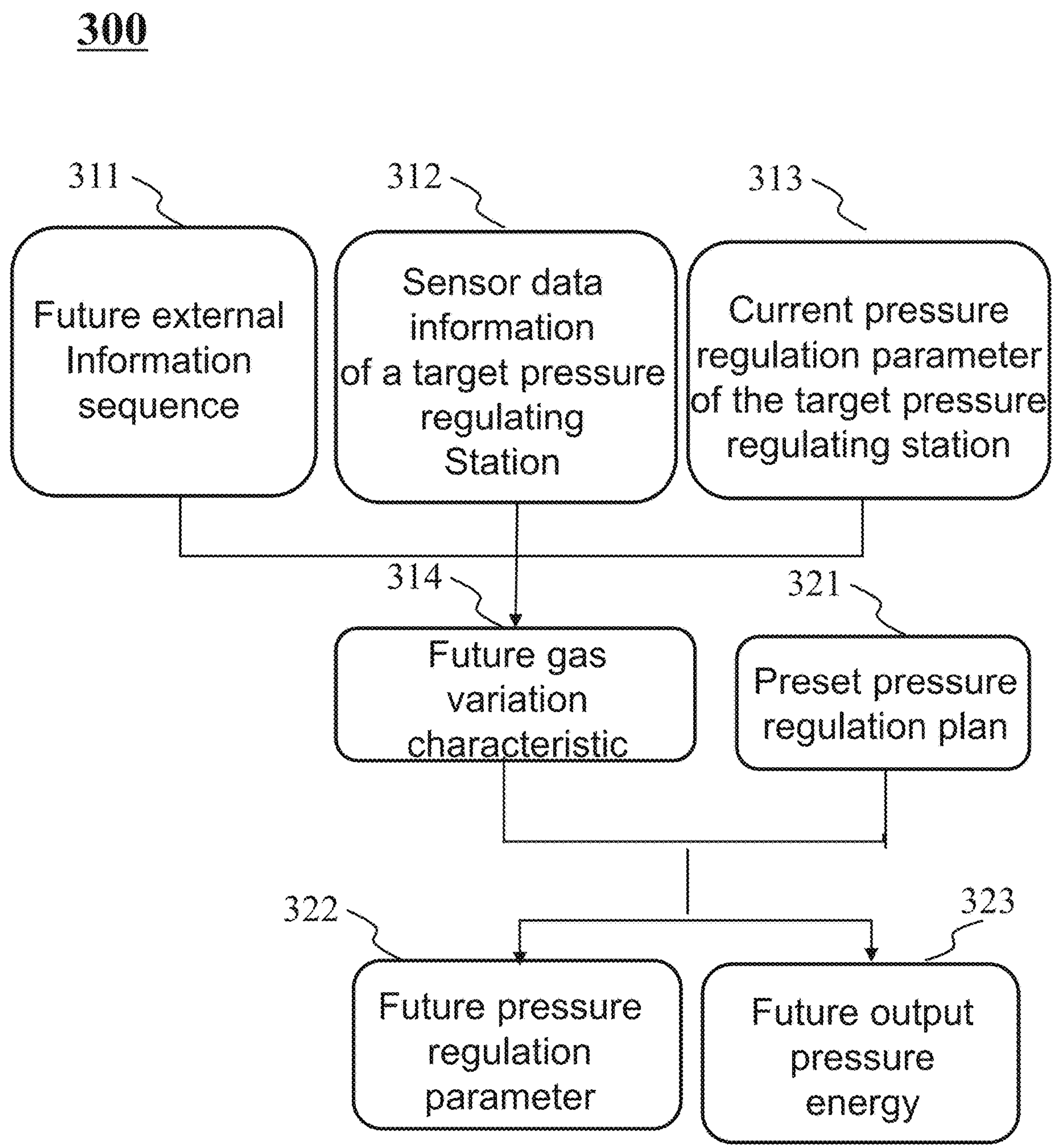
FIG. 3 is a flowchart of an exemplary process for determining a future pressure regulation parameter and a future output pressure energy according to some embodiments of the present disclosure.

FIG. 3 is a flowchart of an exemplary process for determining a future pressure regulation parameter and a future output pressure energy according to some embodiments of the present disclosure. In some embodiments, process 300 may be executed by the gas company management platform 131 in the IoT system 100. As shown in FIG. 3, process 300 includes the following steps 310-320.

Step 310: Determining a future gas variation characteristic 314 of a target pressure regulating station based on a future external information sequence 311, a current pressure regulation parameter 313 of the target pressure regulating station, and sensor data information 312 of the target pressure regulating station.

More descriptions of the future external information sequence, the target pressure regulating station, the current pressure regulation parameters, and the sensor data information may be found in Step 210 of FIG. 2 and the related descriptions thereof.

The future gas variation characteristic refers to a feature that reflects a gas change at the target pressure regulating station during a future preset period.

The future gas variation characteristic may be characterized by a sequence consisting of output pressures, output flow rates, and output temperatures of natural gas from the target pressure regulating station at a plurality of future time points within the future preset period. Hereinafter, the output pressure, the output flow rate, and the output temperature of natural gas from the target pressure regulating station are referred to as the output pressure, the output flow rate, and the output temperature respectively, for brevity.

In some embodiments, the gas company management platform determines the gas variation characteristic through the following steps a11-a14:

Step a11: Determining an impact magnitude of the future external information sequence using a fourth preset lookup table based on the future external information sequence.

In some embodiments, the impact magnitude of the future external information sequence may include a future gas pressure impact magnitude and a future gas temperature impact magnitude.

The future gas pressure impact magnitude and the future gas temperature impact magnitude refer to a degree of influence of the future external information sequence on a set gas pressure of the target pressure regulating station and a degree of influence of the future external information sequence on a set gas temperature of the target pressure regulating station, respectively.

An environmental temperature and an environmental pressure during the future preset period may simultaneously affect the future gas pressure impact magnitude and the future gas temperature impact magnitude.

The fourth preset lookup table contains correspondence relationships between reference external information sequences and reference future gas pressure impact magnitudes and reference future gas temperature impact magnitudes. The fourth preset lookup table may be constructed based on prior knowledge or historical data. For example, if an atmospheric pressure in the future external information sequence is 0.2 MPa during the future preset period, the fourth preset lookup table may indicate that the future gas pressure impact magnitude may be an increase of 0.2 MPa over the set output pressure in the current pressure regulation parameter, and the future gas temperature impact magnitude may be an increase of 5° C. over the set output temperature in the current pressure regulation parameter.

Step a12: Determining an output pressure and an output temperature for each of at least one unit time interval during the future preset period based on the impact magnitude of the external information sequence and the current pressure regulation parameter of the target pressure regulating station.

In some embodiments, for a unit time interval during the future preset period, the gas company management platform determines a sum of the future gas pressure impact magnitude and the set output pressure in the current pressure regulation parameter as the output pressure for the unit time interval, and determines a sum of the future gas temperature impact magnitude and the set output temperature in the current pressure regulation parameter as the output temperature for the unit time interval.

Step a13: Designating the output pressure and the output temperature of each the at least one unit time interval as the gas variation characteristic.

In some embodiments, the gas equipment object platform 160 includes a plurality of pressure regulating stations and at least one pigging station, and the gas company management platform may determine the future gas variation characteristic 314 through the following steps b11-b12:

Step b11: Constructing a gas pipeline network map based on station characteristics of the plurality of pressure regulating stations and the at least one pigging station, and pipeline characteristics of connecting pipelines between the pressure regulating stations and the at least one pigging station.

The station characteristics refer to features related to the pressure regulating stations or the at least one pigging station. In some embodiments, the station characteristics include station types, current pressure regulation parameters and the sensor data of pressure regulating stations, historical pigging parameters of pigging stations, and future external information sequences.

The station types classify whether a station is a pressure regulating station or a pigging station. A historical pigging parameter refers to an actual operational parameter of a pigging station located upstream of and directly connected to a pressure regulating station via a pipeline. More descriptions regarding the pigging parameter may be found in Step 210 of FIG. 2 and the related descriptions thereof.

The pipeline characteristics may include at least one of a pipeline length, a pipeline material, a pipeline diameter, and a pipeline burial depth.

The gas pipeline network map represents connection relationships between pressure regulating stations, pigging stations, and gas pipelines. In some embodiments, the gas pipeline network map is a data structure composed of nodes and edges with attributes.

In some embodiments, the nodes correspond to the pressure regulating stations or the at least one pigging station. Node attributes reflect characteristics of corresponding pressure regulating stations or pigging stations. For example, the node attribute include station types, current pressure regulation parameters and the sensor data of pressure regulating stations, historical pigging parameters of pigging stations, and future external information sequences.

In some embodiments, the node attributes of a node corresponding to a pigging station further include a pigging work plan of the pigging station.

The pigging work plan refers to a pipeline cleaning schedule implemented by the pigging station during the future preset period. For example, the pigging work plan may include a count of gas pipelines requiring cleaning, pipeline lengths, and impurity accumulation degrees within the pipelines. The gas company management platform may estimate the impurity accumulation degrees in the gas pipelines based on pigging intervals. The pigging work plan may be preset by the government regulatory management platform.

In some embodiments, the gas company management platform obtains the pigging work plan from the government regulatory management platform.

In some embodiments of the present disclosure, by incorporating the pigging work plan into the node attributes the gas pipeline network map, the influence of the pigging work plan on the future gas variation characteristic can be represented.

In some embodiments, the edges of the gas pipeline network map may correspond to gas pipelines between nodes. The edges are directed edges that may reflect gas flow directions. Edge attributes may represent characteristics of corresponding gas pipelines. For example, the edge attributes include the pipeline characteristic, or the like.

Step b12: Determining the future gas variation characteristic of the target pressure regulating station through a feature prediction model based on the gas pipeline network map.

Figure 4:
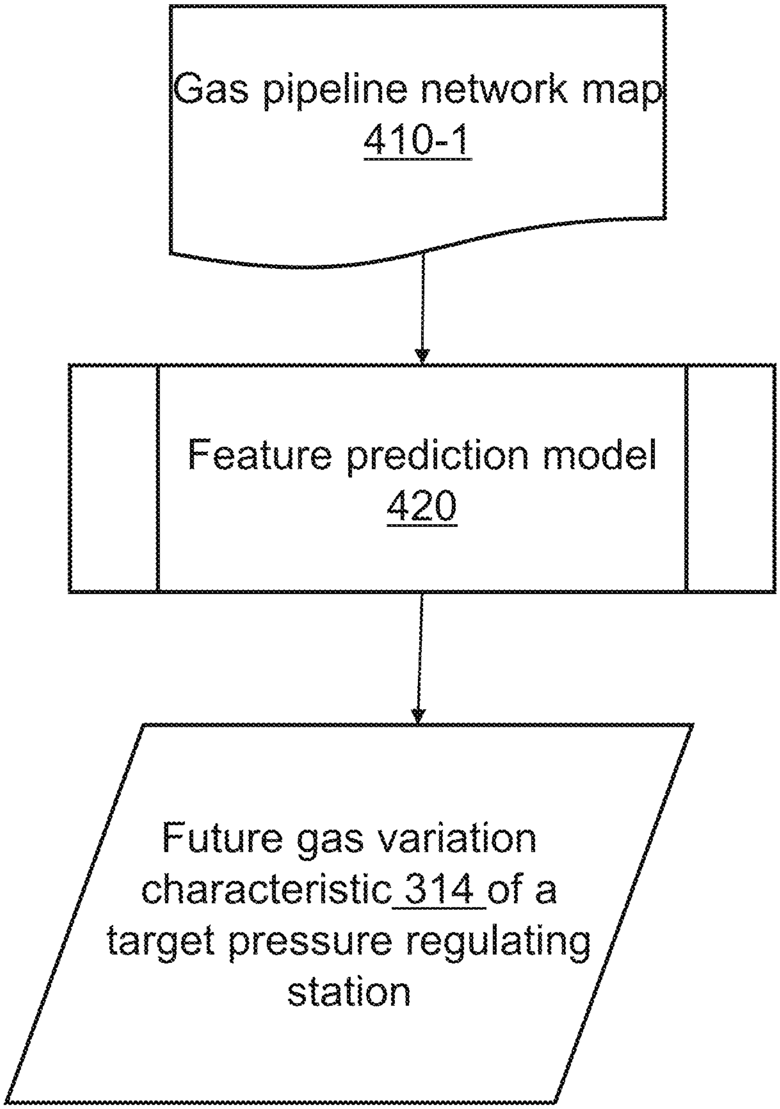
FIG. 4 is a flowchart of an exemplary process for determining a future gas variation characteristic of a target pressure regulating station according to some embodiments of the present disclosure.

More descriptions regarding the determination of the future gas variation characteristic of the target pressure regulating station through the feature prediction model based on the gas pipeline network map may be found in FIG. 4 and related descriptions thereof.

Step 320: Determining a future pressure regulation parameter 322 and a future output pressure energy 323 based on the gas variation characteristic 314 and a preset pressure regulation plan 321.

The preset pressure regulation plan refers to a pre-established natural gas pressure adjustment plan that may not account for the influence of the future external information sequence. The preset pressure regulation plan may be empirically predetermined by a person of ordinary skill in the art. For example, the preset pressure regulation plan may include the set output pressure and the set output temperature for each unit time interval during the future preset period.

In some embodiments, the gas company management platform obtains the preset pressure regulation plan through input from gas management personnel. The gas management personnel refers to a professional responsible for overseeing gas operations within a gas company.

In some embodiments, the gas company management platform adjusts the pressure regulation parameter in the preset pressure regulation plan based on the future gas variation characteristic to obtain an adjusted pressure regulation parameter, and designates the adjusted pressure regulation parameter as the future pressure regulation parameter.

In some embodiments, for a unit time interval during the future preset period, the gas company management platform may determine average values between the future gas variation characteristic (e.g., an output pressure and an output temperature) and the set output pressure and the set output temperature specified in the preset pressure regulation plan for the unit time interval, respectively. The determined averaged values are then designated as the set output pressure and the set output temperature in the adjusted pressure regulation parameter for the unit time interval.

In some embodiments, the gas company management platform further determines a compression ratio in the adjusted pressure regulation parameter by calculating a ratio of the set output pressure for a second unit time interval to the set output pressure for a first unit time interval in the adjusted pressure regulation parameter, wherein the second unit time interval occurs later than the first unit time interval.

In some embodiments, after determining the future pressure regulation parameter, the gas company management platform further adjusts the future pressure regulation parameter based on the future gas variation characteristic, the preset pressure regulation plan, and a future pressure energy demand of the target pigging station.

The future pressure energy demand refers to additional output pressure energy required by the target pigging station to complete pigging operations during the future preset period.

In some embodiments, the gas company management platform determines a total energy consumption demand based on the pigging work plan for the future preset period and then determines the future pressure energy demand based on the total energy consumption demand.

The total energy consumption demand refers to total energy required to complete the pigging work plan.

In some embodiments, the gas company management platform determines the total energy consumption demand by referencing a fifth preset lookup table based on the pigging work plan for the future preset period. The fifth preset lookup table contains a correspondence between reference pigging work plans and reference total energy consumption demands. The fifth preset lookup table may be constructed based on prior knowledge or historical data.

In some embodiments, the gas company management platform determines a difference between the total energy consumption demand and existing stored energy of the target pigging station as the future pressure energy demand. The existing stored energy of the target pigging station includes energy obtained from other energy sources, such as energy generated by solar power at the pigging station or stored electrical energy.

In some embodiments, if the future pressure energy demand is less than or equal to the future output pressure energy, the future pressure regulation parameter remains unchanged.

In some embodiments, if the future pressure energy demand is greater than the future output pressure energy, the gas company management platform adjusts the future pressure regulation parameter (e.g., the compression parameter) based on a preset step size. The gas company management platform then re-determines the future output pressure energy based on the adjusted future pressure regulation parameter and repeats the process until the future pressure energy demand is less or equal to the future output pressure energy, at which point the adjustment stops. The adjusted future pressure regulation parameter obtained from a final adjustment is taken as the finally determined future pressure regulation parameter.

The preset step size refers to the incremental value for increasing the compression parameter, which may be predetermined by those skilled in the art based on experience.

The manner for adjusting the future pressure regulation parameter may include increasing the compression ratio of the compression parameter one or more times according to the preset step size, or the like.

The manner for re-determining the future output pressure energy based on the adjusted future pressure regulation parameter is similar to the manner for determining the future output pressure energy described in Step 210 of FIG. 2.

In some embodiments of the present disclosure, by adjusting the pressure regulation parameter based on the future pressure energy demand of the target pigging station and the future output pressure energy, when the gas company management platform identifies a high future pressure energy demand at the target pigging station, it may increase the future output pressure energy by adjusting the current pressure regulation parameter of the target pressure regulating station (e.g., increasing the compression ratio) without affecting gas consumption at the user end, thereby meeting the future pressure energy demand of the target pigging station.

Since the first upstream pigging station of the target pressure regulating station is performing pigging operations, the pressure of natural gas reaching the inlet of the target pressure regulating station decreases, thereby reducing the future output pressure energy released by the gas output from the target pressure regulating station.

In some embodiments, the future output pressure energy is negatively correlated with the historical pigging parameter of the first upstream pigging station located upstream of the target pressure regulating station. For example, the larger the historical pigging parameter (e.g., a pigging frequency, a pigging ball operating speed, or the like) of the first upstream pigging station is, the smaller the future output pressure energy is.

In some embodiments, the gas company management platform may determine a coefficient based on the historical pigging parameter by referencing a preset coefficient lookup table, and determine a product of the future output pressure energy and the coefficient as the final future output pressure energy.

The preset coefficient lookup table contains a correspondence between reference historical pigging parameters and reference coefficients. The preset coefficient lookup table may be constructed based on prior knowledge or historical data. For example, the closer the historical pigging parameter is to zero, the closer the coefficient is to 1; the larger the historical pigging parameter is, the closer the coefficient is to 0.

More descriptions regarding the historical pigging parameter may be found in Step 310 and the related descriptions thereof.

In some embodiments, the gas company management platform determines the historical pigging parameter through the following Steps S1-S3:

Step S1: Acquiring second upstream sensor data of the target pressure regulating station based on a preset frequency.

The second upstream sensor data refers to a gas temperature, a gas pressure, etc., obtained by a sensor at an intermediate position of a connecting pipeline between a second upstream pigging station and an upstream pressure regulating station during a specific past period (e.g., one day prior to a current time point). The second upstream pigging station refers to a pigging station located upstream of and directly connected to the upstream pressure regulating station. The upstream pressure regulating station refers to a pressure regulating station located upstream of the target pressure regulating station and separated from the target pressure regulating station by one pigging station.

For example, if a gas flow path is: Pigging Station 0-Pressure Regulating Station 0-Pigging Station 1-Pressure Regulating Station 1-Pigging Station 2, where Pressure Regulating Station 1 is the target pressure regulating station, then: Pigging Station 0 is the second upstream pigging station of the target pressure regulating station, Pigging Station 1 is the first upstream pigging station of the target pressure regulating station, Pressure Regulating Station 0 is the upstream pressure regulating station of the target pressure regulating station, and Pigging Station 2 is the target pigging station. In this case, the second upstream sensor data is the gas temperature, the gas pressure, etc., collected by the sensor at the intermediate position of the connecting pipeline between Pigging Station 0 and Pressure Regulating Station 0, or the gas temperature, the gas pressure, etc., collected by the sensor at an inlet position of Pressure Regulating Station 0.

The preset frequency refers to a preconfigured frequency for acquiring the second upstream sensor data of the target pressure regulating station.

In some embodiments, the preset frequency is negatively correlated with the pipeline length in an upstream pipeline characteristic.

The upstream pipeline characteristic refers to a pipeline characteristic of a connecting gas pipeline between the upstream pressure regulating station and the second upstream pigging station. More descriptions regarding the pipeline characteristic may be found in Step 310 of FIG. 3 and the relevant descriptions thereof.

In some embodiments of the present disclosure, by making the preset frequency negatively correlated with the pipeline length in the upstream pipeline characteristics, the reliability of acquiring the second upstream sensor data can be ensured.

Step S2: Determining a second pigging probability of the second upstream pigging station located upstream of the target pressure regulating station based on the second upstream sensor data.

The second pigging probability refers to a probability that the second upstream pigging station is currently performing pigging operations. The gas company management platform may determine the second pigging probability in a manner similar to the manner for determining the first pigging probability. More descriptions regarding the determination of the first pigging probability may be found in Step 210 of FIG. 2 and the relevant descriptions thereof.

Step S3: In response to determining that the second pigging probability is greater than a preset threshold, acquiring the historical pigging parameter from the government regulatory management platform.

The preset threshold refers to a critical value of the second pigging probability, which may be predetermined by those skilled in the art based on experience.

In some embodiments of the present disclosure, in response to determining that the future pressure energy demand of the target pigging station is greater than the future output pressure energy, the future pressure regulation parameter of the target pressure regulating station can be adjusted without affecting the operation of the target pigging station, ensuring that the future output pressure energy released by natural gas output from the target pressure regulating station during the future preset period meets the future pressure energy demand of the target pigging station.

Additionally, if a pigging operation is performed in the pipeline, a gas flow velocity may be affected, causing abnormal upstream sensor data. Therefore, when the second upstream pigging station of the target pressure regulating station is highly likely to perform a pigging operation, considering the impact of the historical pigging parameter on the future output pressure energy can further improve the accuracy of determining the future output pressure energy.

FIG. 4 is a flowchart of an exemplary process for determining a future gas variation characteristic of a target pressure regulating station according to some embodiments of the present disclosure. In some embodiments, process 400 may be implemented by the gas company management 131 of the IoT system 100.

In some embodiments, the gas company management platform determines a future gas variation characteristic 430 of the target pressure regulating station through a feature prediction model 420 based on a gas pipeline network map 410-1. Node attributes of the gas pipeline network map 410-1 include a future external information sequence 311, a current pressure regulation parameter 313 of the target pressure regulating station, and sensor data information 312 of the target pressure regulating station.

More descriptions of the future external information sequence, the target pressure regulating station, the current pressure regulation parameter, and the sensor data information may be found in Step 210 of FIG. 2 and the related descriptions thereof. More descriptions of the future gas variation characteristic and the gas pipeline network map may be found in Step 310 of FIG. 3 and the related descriptions thereof.

In some embodiments, the feature prediction model 420 is a machine learning model. For example, the feature prediction model may be a Graph Neural Network (GNN) model. The future gas variation characteristic may be output by the nodes of the graph neural network.

In some embodiments, the gas company management platform determines a training sample set based on a pigging station distribution.

The training sample set may include a plurality of first training samples. Each of the plurality of first training samples has a corresponding first training label.

The pigging station distribution refers to a positional arrangement of at least one pigging station on the gas pipeline network map.

In some embodiments, to ensure the diversity of first training samples and the training effectiveness of the feature prediction model, the gas company management platform may group different historical gas pipeline network maps-constructed from pigging stations within a same preset range and pressure regulating stations connected to the pigging stations in historical data-into a same training sample set.

The preset range may be an administrative division such as a province, a town, or a city, and may be predefined by those skilled in the art based on experience. Different historical gas pipeline network maps within the same training sample set may share the same pressure regulating stations and pigging stations at their nodes but differ in historical time periods, external information sequences during the periods, etc. This setup ensures diversity among the first training samples in the same training sample set.

In some embodiments, learning rates of different training sample sets are different during training. The learning rate for a training sample set is determined based on a training sample feature of the training sample set.

The learning rate of a training sample set refers to a hyperparameter used to adjust a weight of the training sample set during a learning process of the feature prediction model.

The training sample feature of a training sample set may reflect inherent properties of the first training samples within the training sample set.

In some embodiments, the training sample feature of a training sample set may include gas input pressures of pressure regulating stations corresponding to the nodes of the historical gas pipeline network maps in the training sample set and a reliability level of the training sample set.

The gas input pressure of a pressure regulating station refers to the pressure of gas when entering the inlet of the pressure regulating station. Understandably, first training samples with identical gas input pressures have corresponding pressure regulating stations with more similar current pressure regulation parameters. More descriptions regarding the current pressure regulation parameter may be found in Step 210 of FIG. 2 and the related descriptions thereof.

In some embodiments, the gas company management platform obtains the gas input pressures of pressure regulating stations through historical data.

The reliability of a training sample set reflects the quality of training effectiveness of the training sample set. For example, the higher the reliability level of a training sample set is, the better the training effectiveness of the training sample set is.

In some embodiments, the higher a consistency level of first labels among first training samples within a same training sample set is, the more similar the actual conditions of the first training samples is, thus the better the training effectiveness of the training sample set is when used to train the feature prediction model. The gas company management platform determines a count of first training samples within the same set that share identical first labels. If the count exceeds a preset threshold, the gas company management platform determines that the reliability level of the training sample set is high; otherwise, the reliability level of the training sample set is determined to be low. The preset threshold may be predefined by those skilled in the art based on experience.

In some embodiments, the gas company management platform determines the learning rate of a training sample set by referencing a sixth preset lookup table based on the training sample feature of the training sample set. The sixth preset lookup table contains a correspondence between reference training sample features and reference learning rates, which may be constructed based on prior knowledge or historical data.

In some embodiments, the feature prediction model may be trained using a plurality of training sample sets.

In some embodiments, each first training sample in each of the plurality of training sample sets includes a historical gas pipeline network map, which may be constructed from historical data. The manner for constructing the historical gas pipeline network maps is similar to the manner for constructing the gas pipeline network map, as described in Step 310 of FIG. 3.

In some embodiments, the first training label of a first training sample may represent an actual gas variation characteristic of a pressure regulating station on the historical gas pipeline network map included in the first training sample during a second preset historical period following a first preset historical period. The gas company management platform obtains the first training label from historical data, and the selected pressure regulating station may be any pressure regulating station on the historical gas pipeline network map.

In some embodiments, the gas company management platform inputs a plurality of first training samples with first training labels into an initial feature prediction model, constructs a loss function based on the first training labels and an output of the initial feature prediction model, and iteratively updates parameters of the initial feature prediction model via gradient descent or other techniques based on the loss function. The training is completed when a preset condition is satisfied and a trained feature prediction model is obtained. The preset condition may include convergence of the loss function, a count of iterations reaching an iteration threshold, or the like.

In some embodiments of the present disclosure, determining the learning rate of each training sample set based on the training sample feature of the each training sample set enhances the accuracy of outputs of the trained feature prediction model.

Additionally, using training sample sets determined based on the pigging station distribution ensures the trained feature prediction model is applicable to gas systems across different regions, improving the relevance and practicality of the feature prediction model.

Furthermore, employing the feature prediction model enables rapid and accurate determination of the gas variation characteristic, thereby conserving human resources.

Figure 5:
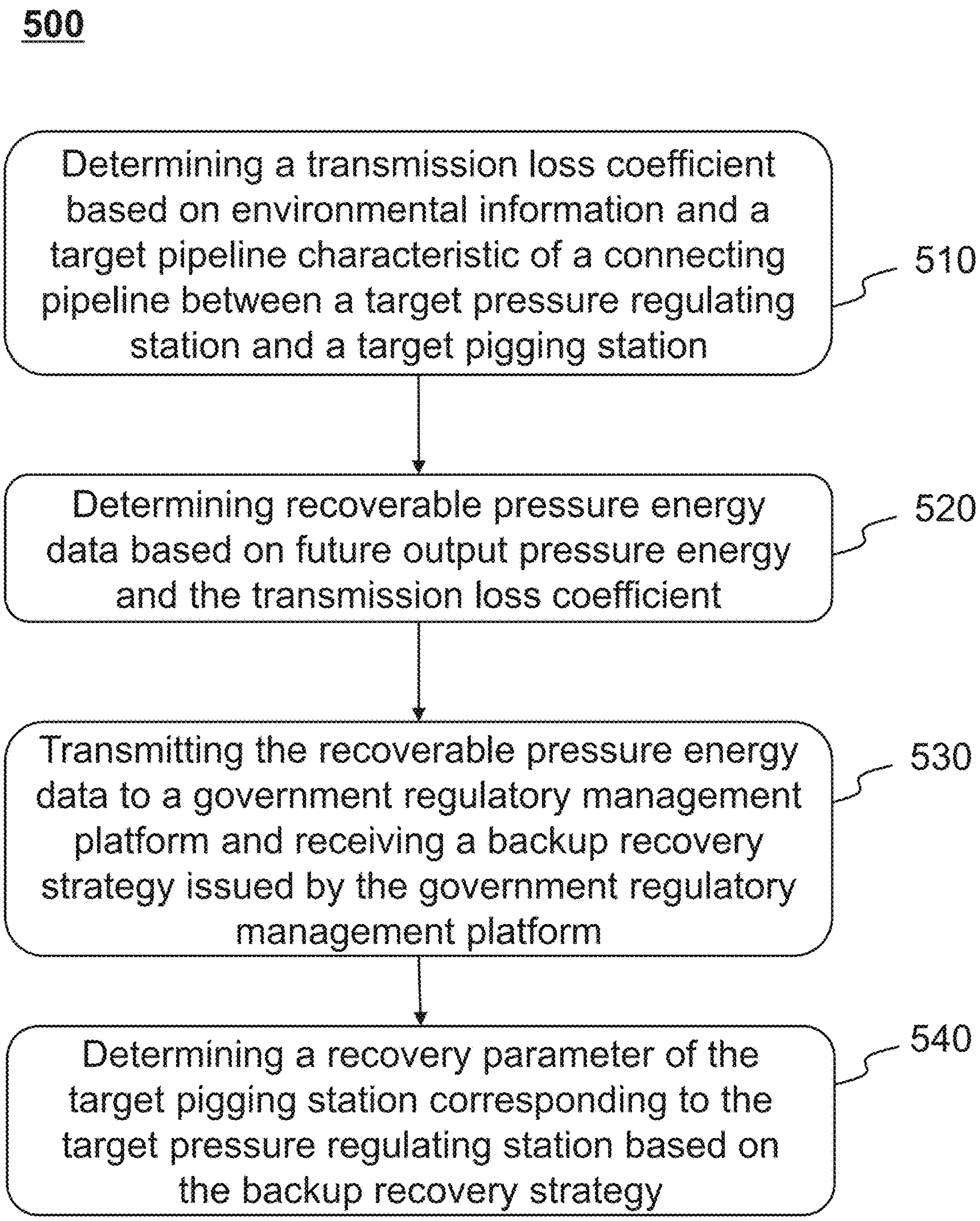
FIG. 5 is a flowchart of an exemplary process for determining a recovery parameter of a target pigging station corresponding to a target pressure regulating station according to some embodiments of the present disclosure.

FIG. 5 is a flowchart of an exemplary process for determining a recovery parameter of a target pigging station corresponding to a target pressure regulating station according to some embodiments of the present disclosure. In some embodiments, process 500 may be executed by the gas company management platform 131 in the IoT system 100. As shown in FIG. 5, process 500 includes the following steps 510 to 540.

Step 510: Determining a transmission loss coefficient based on environmental information and a target pipeline characteristic of a connecting pipeline between the target pressure regulating station and the target pigging station.

More descriptions of the target pressure regulating station, the target pigging station, the target pipeline characteristic, and the environmental information may be found in Step 210 of FIG. 2 and the related descriptions thereof.

The transmission loss coefficient refers to a proportion of future output pressure energy lost during a transmission process from the target pressure regulating station to the target pigging station.

The transmission loss coefficient may be characterized by a weighted sum of a pressure transmission loss coefficient and a temperature transmission loss coefficient, where a weight of the pressure transmission loss coefficient is significantly greater than a weight of the temperature transmission loss coefficient.

The pressure transmission loss coefficient refers to a ratio of an input pressure of natural gas at the target pigging station to an output pressure of natural gas at the target pressure regulating station during a historical preset period. The temperature transmission loss coefficient refers to a ratio of an input temperature of natural gas at the target pigging station to an output temperature of natural gas at the target pressure regulating station during the historical preset period. The historical preset period may be predetermined by those skilled in the art based on experience.

In some embodiments, the weights of the pressure transmission loss coefficient and the temperature transmission loss coefficient may be predetermined by those skilled in the art based on experience. For example, the weight of the pressure transmission loss coefficient may be 0.9, and the weight of the temperature transmission loss coefficient may be 0.1.

In some embodiments, the transmission loss coefficient may also be characterized by an average value of pressure transmission loss coefficients and temperature transmission loss coefficients from sensor data information across a plurality of different historical preset periods.

In some embodiments, the gas company management platform determines the transmission loss coefficient through a vector database based on the target pipeline characteristic and the environmental information of the connecting pipeline between the target pressure regulating station and the target pigging station.

In some embodiments, the gas company management platform determines a target feature vector based on the target pipeline characteristic and the environmental information of the connecting pipeline between the target pressure regulating station and the target pigging station, determines an associated feature vector through the vector database based on the target feature vector, and designates a reference transmission loss coefficient corresponding to the associated feature vector as the transmission loss coefficient for the connecting pipeline between the target pressure regulating station and the target pigging station.

The vector database contains a plurality of reference feature vectors, each associated with a corresponding reference transmission loss coefficient. The reference feature vectors are constructed based on historical data. The historical data includes pipeline characteristics and environmental information of various pipelines, as well as sensor data information of a pressure regulating station and a pigging station at two ends of each of the pipelines.

The gas company management platform may designate a ratio between sensor data information from the historical pressure regulating station to the pigging station as the reference transmission loss coefficient. For example, the gas company management platform may obtain the output pressure and the output temperature of natural gas from a pressure regulating station during a historical preset period, as well as the input pressure and the input temperature of natural gas at a pigging station; determine a ratio of the input pressure of natural gas at the pigging station to the output pressure of natural gas at the pressure regulating station during the historical preset period as a reference pressure transmission loss coefficient; determine a ratio of the input temperature of natural gas at the pigging station to the output temperature of natural gas at the pressure regulating station as a reference temperature transmission loss coefficient; and then determine a weighted sum of the reference pressure transmission loss coefficient and the reference temperature transmission loss coefficient as the reference transmission loss coefficient.

In some embodiments, the gas company may identify a reference feature vector in the vector database that meets a preset condition based on the target feature vector, and designate the reference feature vector as the associated feature vector. The preset conditions may include having a smallest vector distance from the target feature vector, or the like.

Step 520: Determining recoverable pressure energy data based on a future output pressure energy and the transmission loss coefficient.

More descriptions of the future output pressure energy and the recoverable pressure energy data may be found in Step 220 of FIG. 2 and the relevant descriptions thereof.

In some embodiments, the gas company management platform determines a product of the future output pressure energy and the transmission loss coefficient as the recoverable pressure energy data.

Step 530: Sending the recoverable pressure energy data to a government regulatory management platform and obtaining a backup recovery strategy issued by the government regulatory management platform.

More descriptions of the government regulatory management platform may be found in FIG. 1 and the relevant descriptions thereof.

The backup recovery strategy refers to an allocation strategy for the recoverable pressure energy data. The backup recovery strategy reflects a status of an external site corresponding to a pigging energy range and a second energy allocation value. The backup recovery strategy is preset by the government regulatory management platform.

The pigging energy range refers to an energy range defined by an upper limit and a lower limit of a first energy allocation value. The first energy allocation value represents an amount of recoverable pressure energy data allocated to the target pigging station. Understandably, different pigging operations may require different first energy allocation values. The pigging energy range may be preset by the government regulatory management platform.

In some embodiments, the gas company management platform determines the pigging energy range based on a pigging work plan. For example, the gas company management platform may set a maximum value and an average value of a total energy consumption demand specified in the pigging work plan as the upper limit and the lower limit of the pigging energy range, respectively. More descriptions regarding the pigging work plan may be found in FIG. 3 and the relevant descriptions thereof.

The external site refers to other pigging stations excluding the target pigging station or a power generation device. The power generation device may be located within a preset range around the target pigging station. The preset range may be predetermined by those skilled in the art based on experience. The power generation device may be installed within the target pigging station or set up as a standalone unit.

Step 540: Determining the recovery parameter of the target pigging station corresponding to the target pressure regulating station based on the backup recovery strategy.

In some embodiments, the gas company management platform determines the recovery parameter through the following steps k1 to k3:

Step k1: Determining a first energy allocation value through a preset rule based on the pigging energy range in the backup recovery strategy.

The preset rules may specify using a median value or a maximum value of the pigging energy range as the first energy allocation value.

Step k2: In response to the recoverable pressure energy data being greater than the first energy allocation value, determining a second energy allocation value based on the first energy allocation value and the future output pressure energy, and allocating the second energy allocation value to the external site specified in the backup recovery strategy.

In some embodiments, if the recoverable pressure energy data is greater than the first energy allocation value, the gas company management platform determines a difference between the future output pressure energy and the first energy allocation value as the second energy allocation value.

Step k3: Designating the first energy allocation value as the future output pressure energy for the pigging work plan, and re-determining the recovery parameter of the target pigging station corresponding to the target pressure regulating station.

More descriptions regarding re-determining the recovery parameter of the target pigging station corresponding to the target pressure regulating station based on the future output pressure energy may be found in Step 220 of FIG. 2 and the related descriptions thereof.

In some embodiments of the present disclosure, by ensuring that the recovery parameter satisfies the pigging work plan and transmitting surplus energy to other stations, effective utilization of the future output pressure energy can be guaranteed.

In some embodiments, the gas company management platform determines the recovery parameter through the following steps 541 to 543:

Step 541: Generating a plurality of sets of candidate allocation parameters based on the recoverable pressure energy data and the pigging energy range specified in the backup recovery strategy issued by the government regulatory platform.

In some embodiments, each set of the plurality of sets of candidate allocation parameters includes: a first energy allocation value for the target pigging station, a second energy allocation value for an external site, and the external site corresponding to the second energy allocation value.

The first energy allocation value in a set of candidate allocation parameters among the plurality of sets of candidate allocation parameters may be determined based on the pigging energy range. For example, the first energy allocation value in a set of candidate allocation parameters may be randomly generated within the pigging energy range.

Since a sum of the first energy allocation value and the second energy allocation value in a set of candidate allocation parameters is equal to the recoverable pressure energy data, the gas company management platform may determine a difference between the recoverable pressure energy data and the randomly determined first energy allocation value as the second energy allocation value in the set of candidate allocation parameters.

The external site corresponding to the second energy allocation value may be randomly selected from a plurality of eligible external sites.

The multiple eligible external sites may be determined by referencing a seventh preset lookup table based on the target pigging station. The seventh preset lookup table contains a correspondence between reference target pigging stations and reference eligible external sites. For example, the reference eligible external sites may be sites capable of receiving recoverable pressure energy data from the reference target pigging stations. The seventh preset lookup table may be constructed based on prior knowledge or historical data.

Step 542: For each set of candidate allocation parameters among the plurality of sets of candidate allocation parameters, determining an estimated anomaly risk and an estimated energy loss rate for a recovery process corresponding to the set of candidate allocation parameters through a recovery model.

The estimated anomaly risk refers to a magnitude or a probability of risk of an abnormal situation occurring after allocating the recoverable pressure energy data according to the candidate allocation parameters. The abnormal situation may include a reported pipeline leak at the target pigging station or an adjacent pigging station, or a reported energy shortage or an equipment shutdown at an adjacent power generation device, or the like. The adjacent pigging station refers to a pigging station whose straight-line distance from the target pigging station is within a preset range. The adjacent power generation device refers to a power generation device whose straight-line distance from the target pigging station is within the preset range. The preset range may be predetermined by those skilled in the art based on experience.

The estimated energy loss rate refers to a predicted energy loss rate after allocating the recoverable pressure energy data according to the candidate allocation parameters.

The estimated energy loss rate may be represented by (1−(total utilized energy/recoverable pressure energy data)). The total utilized energy may be a sum of energy required by the target pigging station, the adjacent pigging station, and the adjacent power generation device during a future preset period. The future preset period may be predetermined by those skilled in the art based on experience.

In some embodiments, the recovery model is a machine learning model. For example, the recovery model may include a Graph Neural Network (GNN) model, a Recurrent Neural Network (RNN) model, or the like.

In some embodiments, an input of the recovery model may include a set of candidate allocation parameters and a gas pipeline network map, and an output of the recovery model may include the estimated anomaly risk and the estimated energy loss rate for the recovery process corresponding to the set of candidate allocation parameters. More descriptions of the gas pipeline network map may be found in Step 310 of FIG. 3 and the related descriptions thereof.

In some embodiments, the recovery model may be trained using a plurality of second training samples with second training labels.

In some embodiments, each second training sample set among the plurality of second training samples includes a set of historical allocation parameters and a historical gas pipeline network map. The manner of obtaining the historical gas pipeline network map may refer to the relevant descriptions in FIG. 4. The historical allocation parameters may be obtained based on historical data. For example, the gas company management platform determines the historical allocation parameters based on the operating power of pigging stations and external sites in historical data.

In some embodiments, the second training label may represent an actual anomaly risk and an actual energy loss rate corresponding to the second training sample.

The actual anomaly risk may be represented as 0 or 1, where 0 indicates no anomaly risk for the second training sample and 1 indicates the presence of an anomaly risk. The actual anomaly risk may be manually annotated based on historical data. If an abnormal situation exists in the historical data, the gas company management platform may determine that anomaly risk exists and set the anomaly risk to 1. More descriptions of the abnormal situation may be found in Step 542 of FIG. 5 and the related descriptions thereof.

The actual energy loss rate may be represented by (1−(actual total utilized energy/actual recoverable pressure energy data)). The actual total utilized energy may be a sum of actual energy required by the target pigging station, the adjacent pigging station, and the adjacent power generation device during a historical preset period. The actual recoverable pressure energy data refers to the future output pressure energy actually recovered and utilized by the target pigging station.

In some embodiments, the gas company management platform may calculate the actual energy loss rate using the above formula based on historical data.

In some embodiments, the gas company management platform may train the recovery model in a manner similar to the manner for training the feature prediction model to obtain a trained recovery model. More descriptions regarding the training of the feature prediction model may be found in FIG. 4 and the related descriptions thereof.

Step 543: Determining the recovery parameter based on estimated anomaly risks and estimated energy loss rates corresponding to the plurality of sets of candidate allocation parameters.

In some embodiments, the gas company management platform calculates weighted sums of the estimated anomaly risks and the estimated energy loss rates corresponding to the plurality of sets of candidate allocation parameters to obtain a plurality of first values; sorts the plurality of first values to determine a smallest first value; and designates the first energy allocation value of the set of candidate allocation parameters corresponding to the smallest first value as the future output pressure energy to determine the recovery parameter. Weights for the estimated anomaly risk and the estimated energy loss rate are numbers greater than 0 and less than 1, which may be predetermined by those skilled in the art based on experience. For example, the weight for the estimated anomaly risk may be set higher than the weight for the estimated energy loss rate.

More descriptions of determining the recovery parameter based on the future output pressure energy may be found in Step 220 of FIG. 2 and the related descriptions thereof.

In some embodiments of the present disclosure, a plurality of sets of candidate allocation parameters are generated based on the recoverable pressure energy data and the pigging energy range. Then, through the recovery model, candidate allocation parameters with a relatively low estimated anomaly risk and a relatively low estimated energy loss rate are identified to determine an optimal recovery parameter for controlling the operation of at least one of a pigging device and an energy storage device at the target pigging station.

Some embodiments of the present disclosure further provide a non-transitory computer-readable storage medium that stores computer instructions, and when a computer reads the computer instructions in the storage medium, the computer implements the method for energy recovery in a smart gas pipeline network described in one or more embodiments of the present disclosure.

The basic concepts are described above. Obviously, for those skilled in the art, the above detailed disclosure is only an example, and does not constitute a limitation to the present disclosure. Although not expressly stated here, those skilled in the art may make various modifications, improvements, and corrections to the present disclosure. Such modifications, improvements and corrections are suggested in present disclosure, so such modifications, improvements, and corrections still belong to the spirit and scope of the exemplary embodiments of the present disclosure.

Meanwhile, the present disclosure uses specific words to describe the embodiments of the present disclosure. For example, "one embodiment," "an embodiment," and/or "some embodiments" refer to a certain feature, structure or characteristic related to at least one embodiment of the present disclosure. Therefore, it should be emphasized and noted that references to "one embodiment" or "an embodiment" or "an alternative embodiment" two or more times in different places in the present disclosure do not necessarily refer to the same embodiment. In addition, certain features, structures or characteristics in one or more embodiments of the present disclosure may be properly combined.

In addition, unless clearly stated in the claims, the sequence of processing elements and sequences described in the present disclosure, the use of counts and letters, or the use of other names are not used to limit the sequence of processes and methods in the present disclosure. While the foregoing disclosure has discussed by way of various examples some embodiments of the invention that are presently believed to be useful, it should be understood that such detail is for illustrative purposes only and that the appended claims are not limited to the disclosed embodiments, but rather, the claims are intended to cover all modifications and equivalent combinations that fall within the spirit and scope of the embodiments of the present disclosure. For example, although the implementation of various components described above may be embodied in a hardware device, it may also be implemented as a software only solution, e.g., an installation on an existing server or mobile device.

In the same way, it should be noted that in order to simplify the expression disclosed in this disclosure and help the understanding of one or more embodiments of the invention, in the foregoing description of the embodiments of the present disclosure, sometimes multiple features are combined into one embodiment, drawings or descriptions thereof. This manner of disclosure does not, however, imply that the subject matters of the disclosure requires more features than are recited in the claims. Rather, claimed subject matters may lie in less than all features of a single foregoing disclosed embodiment.

In some embodiments, numbers describing the quantity of components and attributes are used. It should be understood that such counts used in the description of the embodiments use the modifiers "about," "approximately," or "substantially" in some examples. Unless otherwise stated, "about", "approximately" or "substantially" indicates that the stated figure allows for a variation of ±20%. Accordingly, in some embodiments, the numerical parameters used in the disclosure and claims are approximations that may vary depending upon the desired characteristics of individual embodiments. In some embodiments, numerical parameters should consider the specified significant digits and adopt the general digit retention method. Although the numerical ranges and parameters used in some embodiments of the present disclosure to confirm the breadth of the range are approximations, in specific embodiments, such numerical values are set as precisely as practicable.

Each of the patents, patent applications, publications of patent applications, and other material, such as articles, books, specifications, publications, documents, things, and/or the like, referenced herein is hereby incorporated herein by this reference in its entirety for all purposes, excepting any prosecution file history associated with same, any of same that is inconsistent with or in conflict with the present document, or any of same that may have a limiting affect as to the broadest scope of the claims now or later associated with the present document. By way of example, should there be any inconsistency or conflict between the description, definition, and/or the use of a term associated with any of the incorporated material and that associated with the present document, the description, definition, and/or the use of the term in the present document shall prevail.

In closing, it is to be understood that the embodiments of the present disclosure disclosed herein are illustrative of the principles of the embodiments of the present disclosure. Other modifications that may be employed may be within the scope of the present disclosure. Thus, by way of example, but not of limitation, alternative configurations of the embodiments of the present disclosure may be utilized in accordance with the teachings herein. Accordingly, embodiments of the present disclosure are not limited to that precisely as shown and described.

What is claimed is:

1. A method for energy recovery in a smart gas pipeline network, implemented by a gas company management platform of an IoT system for energy recovery in a smart gas pipeline network, wherein the IoT system comprises:

the gas company management platform, a gas company sensor network platform, and a gas equipment object platform; the gas company management platform is configured as a physical server, and the physical server has an integrated processor and a dedicated database for the IoT system; the gas company sensor network platform operates based on a data communication device;

the gas company management platform exchanges data with the gas equipment object platform via the gas company sensor network platform operating based on the data communication device;

the gas equipment object platform includes a pressure regulating station and a pigging station, wherein the pressure regulating station includes a pressure regulating device, and the pigging station includes a pigging device and an energy storage device;

the pressure regulating station and the pigging station are arranged in a natural gas pipeline network, such that the pressure regulating station and the pigging station are connected through a gas pipeline, and at least one pressure regulating station and at least one pigging station are alternately arranged, so that each pigging station corresponds to one pressure regulating station; the pressure regulating station is configured to perform pressure regulation during natural gas transportation, the pressure regulation includes pressure boosting or pressure reducing operations, and the pressure regulating station uses at least one of a screw compressor, a centrifugal compressor, a boosting unit, and a pressure regulating valve to perform pressure regulation; a pressure energy released by the pressure regulating station is configured to drive a pig of the pigging station to perform cleaning and maintenance operations on the gas pipeline; an excess pressure energy after driving the pig to complete pipeline cleaning is converted into electrical energy and stored by at least one energy storage device among a generator set and a battery;

the method comprises:

determining a future pressure regulation parameter and a future output pressure energy based on a future external information sequence, a current pressure regulation parameter of a target pressure regulating station, and sensor data information of the target pressure regulating station, wherein the future pressure regulation parameter includes a pressure regulation parameter corresponding to each of at least one unit time interval within a future preset period, and a length of the at least one unit time interval is determined based on a target pipeline characteristic of a connecting pipeline between the target pressure regulating station and a target pigging station;

determining a recovery parameter of the target pigging station corresponding to the target pressure regulating station based on the future output pressure energy, wherein the recovery parameter includes at least one of a pigging parameter and an energy storage device parameter;

generating a recovery instruction based on the recovery parameter; and sending the recovery instruction to the target pigging station via a gateway and a bidirectional data interface of the gas company sensor network platform and controlling an operation of at least one of the pigging device and the energy storage device at the target pigging station, an operation of controlling at least one of the pigging device and the energy storage device in the target pigging station includes controlling a launching speed of a pig and a displacement of an air compressor according to pigging parameters, and controlling an operation of the generator set and a charging and discharging cycle of the generator set according to parameters of the energy storage device.

2. The method of claim 1, wherein the IoT system further comprises a government regulatory management platform configured as a physical server with an integrated processor and a dedicated database, a government regulatory sensor network platform configured with a gateway and a bidirectional data interface and operating based on a data communication device including the aforesaid gateway and bidirectional data interface, and a government regulatory object platform;

the government regulatory object platform includes the gas company management platform;

the gas company management platform and the government regulatory management platform are respectively deployed on different servers;

the gas company management platform and the government regulatory management platform exchange data via the gateway and bidirectional data interface of the government regulatory sensor network platform; and the government regulatory sensor network platform and the gas company sensor network platform operate based on a data communication device.

3. The method of claim 1, wherein the determining a future pressure regulation parameter and a future output pressure energy based on a future external information sequence, a current pressure regulation parameter of a target pressure regulating station, and sensor data information of the target pressure regulating station includes:

determining a future gas variation characteristic of the target pressure regulating station based on the future external information sequence, the current pressure regulation parameter of the target pressure regulating station, and the sensor data information of the target pressure regulating station;

determining the future pressure regulation parameter and the future output pressure energy based on the future gas variation characteristic and a preset pressure regulation plan;

determining recoverable pressure energy data based on the future output pressure energy; and determining the recovery parameter of the target pigging station corresponding to the target pressure regulating station based on the recoverable pressure energy data.

4. The method of claim 3, wherein the gas equipment object platform includes a plurality of pressure regulating stations and at least one pigging station; and the determining the future gas variation characteristic of the target pressure regulating station based on the future external information sequence, the current pressure regulation parameter of the target pressure regulating station, and the sensor data information of the target pressure regulating station includes:

constructing a gas pipeline network map based on station characteristics of the plurality of pressure regulating stations and the at least one pigging station, and pipeline characteristics of connecting pipelines between the pressure regulating stations and the at least one pigging station, wherein the station characteristics include current pressure regulation parameters and sensor data information of the pressure regulating stations, and the future external information sequence; and determining the future gas variation characteristic of the target pressure regulating station through a feature prediction model based on the gas pipeline network map, wherein the feature prediction model is a machine learning model.

5. The method of claim 3, wherein the method further comprises:

adjusting the future pressure regulation parameter based on the future gas variation characteristic, the preset pressure regulation plan, and a future pressure energy demand of the target pigging station;

wherein the future pressure energy demand is determined by:

determining a total energy consumption demand based on a pigging work plan for the future preset period; and determining the future pressure energy demand based on the total energy consumption demand.

6. The method of claim 1, wherein the determining a recovery parameter of the target pigging station corresponding to the target pressure regulating station based on the future output pressure energy includes:

determining a transmission loss coefficient based on environmental information and the target pipeline characteristic of the connecting pipeline between the target pressure regulating station and the target pigging station;

determining recoverable pressure energy data based on the future output pressure energy and the transmission loss coefficient;

transmitting the recoverable pressure energy data to the government regulatory management platform via the gateway and bidirectional data interface of the government regulatory sensor network platform and receiving a backup recovery strategy issued by the government regulatory management platform; and determining the recovery parameter of the target pigging station corresponding to the target pressure regulating station based on the backup recovery strategy.

7. An Internet of Things (IoT) system for energy recovery in a smart gas pipeline network, comprising:

a government regulatory management platform, a government regulatory sensor network platform, a government regulatory object platform, a gas company sensor network platform, and a gas equipment object platform;

wherein:

the government regulatory object platform includes a gas company management platform;

the gas company management platform and the government regulatory management platform are respectively deployed on different servers; the government regulatory management platform is configured as a first physical server having an integrated processor and a first database;

the gas company management platform is configured as a second physical server having an integrated processor and a second database, and the first physical server and the second physical server are independent and different hardware devices each having a dedicated processor; the government regulatory sensor network platform is configured with a gateway and a bidirectional data interface, and operates based on a data communication device to enable the gas company management platform and the government regulatory management platform to exchange data through the gateway and the bidirectional data interface of the government regulatory sensor network platform;

the gas company management platform and the government regulatory management platform exchange data via the government regulatory sensor network platform to exchange data with the gas equipment object platform; the gas equipment object platform includes a pressure regulating station and a pigging station, the pressure regulating station and the pigging station are connected to each other through a gas pipeline, the pressure regulating station is installed in a natural gas pipeline network, the pigging station is installed on the natural gas pipeline network, the at least one pressure regulating station and the at least one pigging station are alternately arranged, and each pigging station corresponds to one pressure regulating station; the pressure regulating station includes a pressure regulating device, and the pigging station includes a pigging device and an energy storage device; the pressure regulating station is used for pressure regulation during natural gas transportation, including pressure boosting or pressure reducing operations, the pressure regulating device includes at least one of a screw compressor, a centrifugal compressor, a boosting unit, and a pressure regulating valve; the pigging station is configured for cleaning and maintenance of gas pipelines, the pigging device includes a pig, and the energy storage device includes at least one of a generator set and a battery; a pressure energy released by the pressure regulating station is configured to drive the pig to perform pipeline cleaning, and an excess pressure energy after driving the pig to perform pipeline cleaning is converted into electrical energy and stored by the energy storage device;

the gas company management platform is configured to, via the integrated processor of the second physical server;

determine a future pressure regulation parameter and a future output pressure energy based on a future external information sequence, a current pressure regulation parameter of a target pressure regulating station, and sensor data information of the target pressure regulating station, wherein the future pressure regulation parameter includes a pressure regulation parameter corresponding to each of at least one unit time interval within a future preset period, and a length of the at least one unit time interval is determined based on a target pipeline characteristic of a connecting pipeline between the target pressure regulating station and a target pigging station;

determine a recovery parameter of the target pigging station corresponding to the target pressure regulating station based on the future output pressure energy, wherein the recovery parameter includes at least one of a pigging parameter and an energy storage device parameter;

generate a recovery instruction based on the recovery parameter; and send the recovery instruction to the target pigging station through the gateway and the bidirectional data interface of the gas company sensor network platform and control an operation of at least one of the pigging device and the energy storage device at the target pigging station, an operation of controlling at least one of the pigging device and the energy storage device in the target pigging station includes controlling a launching speed of a pig and a displacement of an air compressor according to pigging parameters, and controlling an operation of the generator set and a charging and discharging cycle of the generator set according to parameters of the energy storage device.

8. The IoT system of claim 7, wherein the length of the at least one unit time interval is further related to a first pigging probability of the target pigging station.

9. The IoT system of claim 7, wherein the gas company management platform is further configured to:

determine a future gas variation characteristic of the target pressure regulating station based on the future external information sequence, the current pressure regulation parameter of the target pressure regulating station, and the sensor data information of the target pressure regulating station;

determine the future pressure regulation parameter and the future output pressure energy based on the future gas variation characteristic and a preset pressure regulation plan;

determine recoverable pressure energy data based on the future output pressure energy; and determine the recovery parameter of the target pigging station corresponding to the target pressure regulating station based on the recoverable pressure energy data.

10. The IoT system of claim 9, wherein the gas equipment object platform includes a plurality of pressure regulating stations and at least one pigging station; and the gas company management platform is further configured to:

construct a gas pipeline network map based on station characteristics of the plurality of pressure regulating stations and the at least one pigging station, and pipeline characteristics of connecting pipelines between the pressure regulating stations and the at least one pigging station, wherein the station characteristics include current pressure regulation parameters and sensor data information of the pressure regulating stations, and the future external information sequence; and determine the future gas variation characteristic of the target pressure regulating station through a feature prediction model based on the gas pipeline network map, wherein the feature prediction model is a machine learning model.

11. The IoT system of claim 10, wherein the gas pipeline network map includes nodes corresponding to the at least one pigging station and the pressure regulating stations, and a node attribute of the nodes includes a pigging work plan of the at least one pigging station.

12. The IoT system of claim 10, wherein the feature prediction model is trained based on first training samples with first labels from a plurality of training sample sets; and the gas company management platform is further configured to:

determine the training sample set based on a pigging station distribution;

wherein each of the training sample sets includes a plurality of first training samples, different training sample sets are associated with different learning rates during training, and the learning rate of each of the training sample sets is determined based on a training sample characteristic of the training sample set.

13. The IoT system of claim 9, wherein the gas company management platform is further configured to:

adjust the future pressure regulation parameter based on the future gas variation characteristic, the preset pressure regulation plan, and a future pressure energy demand of the target pigging station;

wherein to determine the future pressure energy demand, the gas company management platform is further configured to:

determine a total energy consumption demand based on a pigging work plan for the future preset period; and determine the future pressure energy demand based on the total energy consumption demand.

14. The IoT system of claim 13, wherein the future output pressure energy is further related to a historical pigging parameter of a pigging station located upstream of the target pressure regulating station.

15. The IoT system of claim 14, wherein the historical pigging parameter is determined by:

acquiring second upstream sensor data of the target pressure regulating station based on a preset frequency;

determining a second pigging probability of a second upstream pigging station located upstream of the target pressure regulating station based on the second upstream sensor data; and in response to determining that the second pigging probability is greater than a preset threshold, acquiring the historical pigging parameter from the government regulatory management platform.

16. The IoT system of claim 15, wherein the preset frequency is inversely correlated with a pipeline length in an upstream pipeline characteristic.

17. The IoT system of claim 7, wherein the gas company management platform is further configured to:

determine a transmission loss coefficient based on environmental information and the target pipeline characteristic of the connecting pipeline between the target pressure regulating station and the target pigging station;

determine recoverable pressure energy data based on the future output pressure energy and the transmission loss coefficient;

transmit the recoverable pressure energy data to the government regulatory management platform via the gateway and the bidirectional data interface of the government regulatory sensor network platform and receive a backup recovery strategy issued by the government regulatory management platform; and determine the recovery parameter of the target pigging station corresponding to the target pressure regulating station based on the backup recovery strategy.

18. The IoT system of claim 17, wherein the gas company management platform is further configured to:

generate a plurality of sets of candidate allocation parameters based on the recoverable pressure energy data and a pigging energy range specified in the backup recovery strategy issued by the government regulatory platform, wherein each set of candidate allocation parameters among the plurality of sets of candidate allocation parameters includes a first energy allocation value for the target pigging station and a second energy allocation value for an external site, the first energy allocation value is determined based on the pigging energy range, and a sum of the first energy allocation value and the second energy allocation value equals the recoverable pressure energy data;

for each set of candidate allocation parameters among the plurality of sets of candidate allocation parameters, determine an estimated anomaly risk and an estimated energy loss rate for a recovery process corresponding to the set of candidate allocation parameters via a recovery model, the recovery model being a machine learning model; and determine the recovery parameter based on estimated anomaly risks and estimated energy loss rates corresponding to the plurality of sets of candidate allocation parameters.

19. The IoT system of claim 18, wherein the pigging energy range is determined based on a pigging work plan.

* * * * *